US006028759A

United States Patent [19]

Hofbauer et al.

[11] Patent Number: 6,028,759

[45] Date of Patent: Feb. 22, 2000

[54] ELECTRICAL APPARATUS, IN PARTICULAR A SURGE ARRESTOR, HAVING AN APPARATUS FOR INDICATING A FAULT CURRENT

[75] Inventors: Werner Hofbauer, Baden; Walter Schmidt, Bellikon, both of Switzerland

[73] Assignee: Asea Brown Boveri AG, Baden, Switzerland

[21] Appl. No.: 09/186,887

[22] Filed: Nov. 6, 1998

[30] Foreign Application Priority Data

Nov. 8, 1997 [DE] Germany .......................... 197 49 522

[51] Int. Cl.[7] ...................................................... H02H 3/22

[52] U.S. Cl. ......................... 361/118; 361/124; 361/103; 340/653

[58] Field of Search .................................... 361/103, 106, 361/111, 91.4, 117–118, 124–127, 131–132; 340/647, 649, 653, 660, 664

[56] References Cited

U.S. PATENT DOCUMENTS 5,237,482 8/1993 Osterhout et al. ...................... 361/117
5,325,087 6/1994 Mikli ...................................... 340/635
5,341,271 8/1994 Hutchinson ............................. 361/123

FOREIGN PATENT DOCUMENTS

0564334A1 10/1993 European Pat. Off. .

*Primary Examiner*—Michael J. Sherry
*Attorney, Agent, or Firm*—Burns, Doane, Swecker & Mathis, L.L.P.

[57] ABSTRACT

The electrical apparatus, which is designed in particular as a surge arrestor (3), has a dielectric housing (8) which can be loaded with high voltage as well as an apparatus for optical indication of a fault state caused by a fault current. The indicating apparatus is designed as an information carrier (9) which covers at least a portion of the outer surface of the dielectric housing (8). This information carrier (9) emits an optically detectable signal when heated to a limiting temperature which is above a permissible operating temperature of the apparatus. The information carrier (9) is advantageously designed as a thermocolor. A faulty apparatus can then be identified by the maintenance personnel for a system containing the electrical apparatus, in a simple and reliable manner by means of a color change.

11 Claims, 1 Drawing Sheet

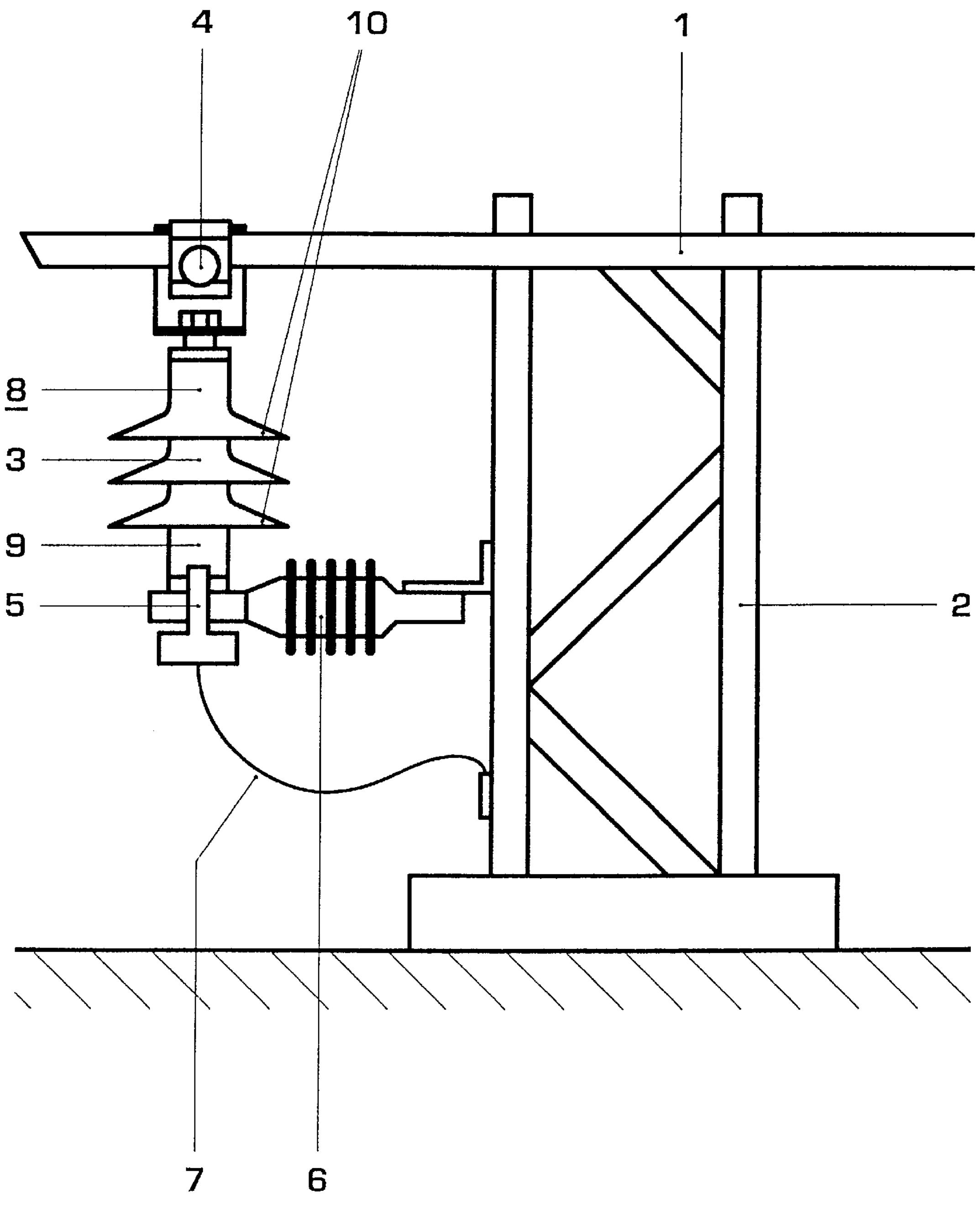
4
10
1
8
3
9
5
2
7
6

ELECTRICAL APPARATUS, IN PARTICULAR A SURGE ARRESTOR, HAVING AN APPARATUS FOR INDICATING A FAULT CURRENT

BACKGROUND OF THE INVENTION

1. Field of the Invention

The invention is based on an electrical apparatus, in particular a surge arrestor.

2. Discussion of Background

The invention refers to a prior art of electrical apparatuses as is specified in EP 0 564 334 A1. An electrical apparatus which is described in this prior art and is preferably designed as a surge arrestor or as an insulator for high-voltage or medium-voltage grid systems, contains a detection and indicating apparatus which is used to monitor the electrical apparatus for a fault current. This apparatus has a dielectric housing with an easily frangible window. An electrical connection of the electrical apparatus is passed through the dielectric housing. The part of the electrical connection located in the housing interior is surrounded by a magnet core, which is fitted with the secondary winding of a current transformer that has the electrical connection as the primary winding. The secondary winding is connected to a non-reactive resistor which is embedded in an explosive charge that is arranged in the housing interior. When a fault current occurs, the non-reactive resistor, which is continuously fed with current from the current transformer, is heated very severely. The resistor detonates the explosive charge above a critical limiting temperature. The window of the dielectric housing is in consequence broken open and a colored ribbon, which is used as an indicating element, is ejected from the housing. After tripping and optical signaling of the fault state, the electrical apparatus and the detection and indicating apparatus are removed and replaced.

SUMMARY OF THE INVENTION

Accordingly, one object of the invention is to provide a novel electrical apparatus of the type mentioned initially, in which the fault state of the electrical apparatus can be identified with extremely simple means and nevertheless with high reliability.

In the case of the electrical apparatus according to the invention, a faulty operating state caused by a fault current is indicated by an information carrier which covers at least a portion of the outer surface of a dielectric housing of the apparatus. This information carrier is heated by the fault current to a limiting temperature which is above the permissible operating temperature of the apparatus. When the limiting temperature is exceeded, this information carrier emits an optical signal which can be detected easily and reliably. Since such an information carrier advantageously contains a thermocolor that is provided on the dielectric housing, such an apparatus can be produced in a simple and cost-effective manner, and already existing apparatuses can be retrofitted without any major cost, by applying the thermocolor to the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the single FIGURE shows a phase conductor of a high-voltage line, which is electrically conductively connected to an electrical apparatus according to the invention, which is designed as a surge arrestor and contains an apparatus for indicating fault currents.

DESCRIPTION OF THE PREFERRED EMBODIMENTS

Referring now to the drawings, wherein like reference numerals designate identical or corresponding parts throughout the several views, the designation 1 in the figure denotes a phase conductor of a high-voltage line which is held in an electrically insulated manner on a grounded pylon 2. A surge arrestor 3 is attached to the phase conductor 1. The surge arrestor 3 is conductively connected by means of an electrical connection 4 to the phase conductor 1, and is attached to the pylon 2 with the aid of a supporting insulator 6. A second electrical connection 5 of the surge arrestor 3 is conductively connected to the pylon 2 via a ground cable 7. A dielectric housing 8 which is loaded with high voltage surrounds a stack (which is not illustrated but is arranged between the electrical connections 4, 5) of non-linear resistor elements based on metal oxides and is fitted with an apparatus, designed as an information carrier 9, for optical indication of a surge arrestor fault state caused by a fault current. The housing 8 is advantageously composed of a porcelain or a polymer filled with a filler such as, in particular, a silicone and/or an epoxy, and preferably has shields 10 composed of porcelain or silicone.

The information carrier 9 is provided on a portion of the outer surface of the dielectric housing 8. When a fault current which is carried through the resistor stack occurs, this portion of the outer surface of the dielectric housing 8 is heated to a temperature which is above a permissible operating temperature of the apparatus. If a limiting temperature of, typically, 150 to 500° C., which is above the permissible operating temperature (for example 105° C.) is exceeded, the information carrier 9 emits an optically detectable signal.

Since the dielectric housing 8 is in general not heated uniformly by the fault current, the information carrier 9 is advantageously arranged on a portion of the outer surface of the housing 8 which is subjected to the temperature-raising influence of the fault current and can easily be identified externally, in particular underneath or above one of the shields 10.

The information carrier 9 preferably contains a thermocolor, for example $[Co(NH_3)_6].PO_4$, which is applied to the outer surface or to at least a portion of the outer surface of the housing 9. This thermocolor changes its color above the limiting temperature, $[Co(NH_3)_6].PO_4$ for example, changing from yellow to blue at 200° C., and retains this color even after the temperature is reduced below the limiting temperature. The color change therefore provides in a simple manner a permanent indication that the surge arrestor 3 which can be identified by the color change is defective.

The thermocolor can be added to the raw materials which form the material during the production of the material which forms the housing. A housing 8 formed from such material then at the same time represents the information carrier 9. In order to retrofit an existing apparatus, the thermocolor can alternatively be applied in the form of a ribbon or of a strip at least to a portion of the outer surface of the housing 8, forming a heat-transmitting contact surface. The thermocolor can be applied in a particularly simple manner by spraying or painting at least a portion of the outer surface of the housing 9.

In order to be able to identify the information carrier 9 well, particularly in darkness, it is recommended that it be designed to be luminous and/or reflective. This can be achieved in a particularly advantageous manner by adding a luminous paint or reflective particles to the thermocolor.

Instead of being attached to a surge arrestor, the information carrier can also be attached to another electrical apparatus, for example an insulator of a switch or of a transformer, or an insulator of a high-voltage system, for example the supporting insulator 6.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An electrical apparatus, in particular a surge arrestor, having a dielectric housing which can be loaded with high voltage and having an apparatus for optical indication of a fault state caused by a fault current, wherein the indicating apparatus is designed as an information carrier which covers at least a portion of the outer surface of the dielectric housing and emits an optically detectable signal when heated to a limiting temperature, which is above a permissible operating temperature of the apparatus.

2. The electrical apparatus as claimed in claim 1, wherein the limiting temperature is between 150 and 500° C.

3. The electrical apparatus as claimed in claim 1, wherein the information carrier is provided on a portion of the outer surface of the housing which is subjected to the temperature-raising influence of the fault current.

4. The electrical apparatus as claimed in claim 3, wherein the information carrier is provided underneath or above one of the shields of a housing which is designed as a shielded hollow insulator.

5. The electrical apparatus as claimed in claim 1, wherein the information carrier contains a thermocolor.

6. The electrical apparatus as claimed in claim 5, wherein the thermocolor is selected such that it also retains its color produced above the limiting temperature after the temperature has fallen below the limiting temperature.

7. The electrical apparatus as claimed in claim 5, wherein the thermocolor is applied to the outer surface or to at least a portion of the outer surface of the housing.

8. The electrical apparatus as claimed in claim 5, wherein the thermocolor is incorporated in the material which forms the housing.

9. The electrical apparatus as claimed in claim 5, wherein the thermocolor is applied in the form of a ribbon or of a strip at least to a portion of the outer surface of the housing, forming a heat-transmitting contact surface.

10. The electrical apparatus as claimed in claim 5, wherein the thermocolor is painted or sprayed at least onto a portion of the outer surface of the housing.

11. The electrical apparatus as claimed in claim 1, wherein the information carrier is designed to be luminous and/or reflective.

* * * * *